Oct. 22, 1929.  E. C. LEHNEN  1,732,583
GAS WASHER
Filed Jan. 19, 1925
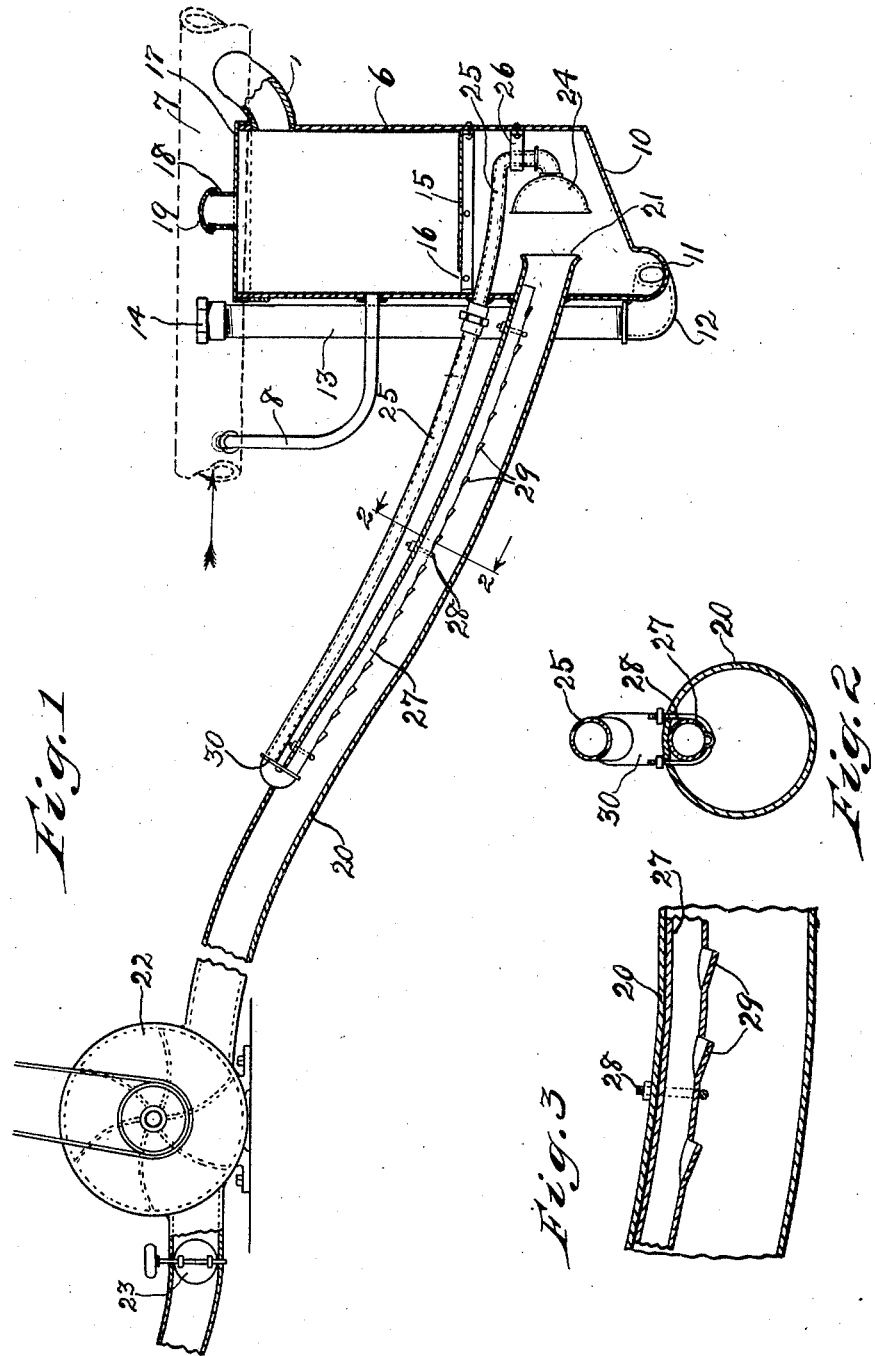

Patented Oct. 22, 1929

1,732,583

UNITED STATES PATENT OFFICE

EDWARD CHARLES LEHNEN, OF CHICAGO, ILLINOIS

GAS WASHER

Application filed January 19, 1925. Serial No. 3,232.

My invention relates to smoke conveying and soot collecting means, and has for an object to prevent the solid particles in smoke, like soot, from getting out into the atmosphere. Another object is to provide means for collecting the solid particle so that the various ingredients retained therein, such as coal-tar, phenol, etc., may be reclaimed to some extent in any approved manner and utilized.

Other objects will appear hereinafter.

The invention consists in the combinations and arrangements of parts hereinafter described and claimed.

The invention will be best understood by reference to the accompanying drawings forming a part of this specification, and in which, Fig. 1 is a vertical sectional view of my invention;

Fig. 2 is an enlarged cross sectional view taken on line 2—2 of Fig. 1; and

Fig. 3 is an enlarged fragmentary sectional view showing the conduit and sprinkling means therein.

The form of my invention illustrated comprises a setting tank 6 adapted for containing liquid and arranged adjacent liquid containing or conveying means 7, as a sewer conduit or the like, and having an inlet pipe 8 and an outlet pipe 9, of suitable size, extending from the upper part of said tank to points within said conveying means 7, and preferably opening above the bottom of said conveying means, as shown, to provide a slow and steady circulation of liquid from said liquid conveying means through said tank, and at the same time avoiding any heavy or solid elements in the liquid in said conveying means from flowing into said tank. The bottom of the tank is arranged at a slant, having a sump 11 provided at the lowest part and terminating in the form of an elbow 12 from which a clean-out tube or pipe 13 extends upwards, preferably to the top of the tank, and a cap 14 closes said tube.

Means, in the form of a partition or baffle plate 15, with one or more outlet holes 16 is mounted across an intermediate part of the tank, to form an upper and a lower chamber in said tank and to retard or check the rapid upward flow of smoke and water in the tank and to break up the bubbles created in the liquid or water in said tank by the inward rush of the smoke and air. A top 17 is removably mounted on the tank to provide access thereto, and a neck 18 with an openable cap 19 may also be provided to furnish convenient access and inspection to said tank. The outlet pipe 9 will be made of sufficient size to permit the gases from the smoke to escape out of the tank. and the tank may be placed in any convenient location as in the basement or beneath the basement floor.

The means for conveying smoke from the chimney, and the like, to the tank preferably comprises a conduit 20 which extends with its outlet end 21 down into the lower chamber or part of the tank beneath baffle plate 15. A blower fan 22 is mounted in said conduit to force the smoke into the tank, and a control valve or damper 23 is preferably interposed in the conduit.

Means is provided for sprinkling the smoke as it is conveyed into the tank, to effectively weigh down and settle the solid particles, and thus deflect them down into sump 11. This sprinkling means preferably comprises a cup or enlarged receiving portion 24 mounted in the lower chamber of the tank, in alinement with conduit 20 and near outlet end 21 thereof, so as to receive considerable current of smoke gas, mingled with water from said conduit, after the moistened and weighted particles have dropped away therefrom. A pipe 25, supported in bracket 26 extends from said cup outward of the tank along the conduit, and is bent over and has a portion 27 inserted into said conduit 20, and extends along the upper interior part thereof toward the outlet end 21, being supported by suitable yokes 28. Lips or tongues 29 are formed at the lower side of portion 27 of pipe 25, by cutting slits upwardly into said portions to provide downwardly slanting lips and openings thereover, thus providing for an additional suction on the fluid passing downwardly in portion 27 of pipe 25, so as to issue over the current of smoke which is being forced down through conduit 20 into the lower chamber of tank 6. A bracket plate 30 supports the bent connecting portion between pipe 25 and the perforated portion 27.

In operation, the smoke is conducted from a chimney or the like and is forced by a fan 22 through conduit 20 into the lower chamber of tank 6, and as it issues from outlet end 21 the moistened heavier particles like soot drop down into the sump, while the current of the lighter smoke with an amount of water mingled therewith passes into cup 24 and is forced up through pipe 25 into portion 27 to issue out of the outlet openings formed by bending down lips 29, this downward arrangement of lips 29 and the openings thereover providing an additional suction to the fluid within portion 27 as the current of smoke passes through conduit 20, and this current of smoke forces the water downward out of this conduit into the tank. The baffle plate or partition 15 tends to retain the sediment in the lower part of the tank 6, where solid particles gravitate into the sump 11 and elbow 12, to be taken therefrom when desired.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A device of the class described comprising a settling tank adapted to contain liquid and having a smoke outlet, a smoke conveying conduit leading into the lower part of said tank, an inlet cup placed in front of the outlet of said conduit within said lower part of the tank, a pipe extending from said cup out through said tank and along said conduit and having a portion extending into said conduit and toward the outlet end thereof, and lips formed on said portion with slits thereover to direct liquid onto said smoke flowing through said conduit, and means for forcing smoke through the tank through said conduit.

2. A device of the class described comprising a settling tank with a slanting bottom having an inlet and an outlet connecting its upper end with a liquid conveying member, a baffle plate with an opening in said tank, a sump in the slanting bottom of said tank, a clean-out tube extending upward from said sump, a smoke conveying conduit opening into said tank beneath said baffle plate, means for sprinkling water in said conduit, said means including a cup adjacent the discharge end of said conduit and a pipe extending therefrom into said conduit and having lips and discharge openings thereover, and means for forcing smoke through said conduit and thereby forcing water through said cup and pipe to sprinkle the water on the smoke flowing through said conduit.

3. A device of the class described comprising a settling tank having an upper and a lower intercommunicating chambers divided by a baffle board, an inlet and outlet port in said upper chamber, a smoke conveying conduit opening into the lower chamber, a pipe having an inlet portion near the conduit opening and within fluid provided in said tank, said pipe extending into the conduit and having openings for intermingling fluid with the smoke in said conduit, and means for forcing products of combustion through said conduit and pipe.

4. A device of the kind described comprising a settling tank having an upper and a lower intercommunicating compartments divided by a baffle board, inlet and outlet means in said upper chamber connecting said tank to a head of water, a smoke conveying conduit extending into the lower chamber, said baffle board serving to retard upward flow of solid particles into said upper chamber, means to remove settled particles at the bottom of said lower chamber, and means for ejecting products of combustion through said conduit.

5. A device of the class described comprising a settling tank with an upper and a lower chamber, means effecting communication between the chambers, a smoke conveying conduit opening into the lower chamber of said tank, a pipe having an inlet facing the conduit opening and placed within liquid in said tank, said pipe extending into said conduit and having means for discharging liquid onto the smoke in said conduit, a smoke outlet in said upper chamber, and means for forcing smoke through said conduit and for forcing liquid through said pipe.

In testimony whereof I have signed my name to this specification.

EDWARD CHARLES LEHNEN.